United States Patent
Christensen et al.

(10) Patent No.: US 7,726,975 B2
(45) Date of Patent: Jun. 1, 2010

(54) LITHIUM RESERVOIR SYSTEM AND METHOD FOR RECHARGEABLE LITHIUM ION BATTERIES

(75) Inventors: John F. Christensen, Mountain View, CA (US); Jasim Ahmed, Menlo Park, CA (US); Sungbae Park, Cupertino, CA (US); Aleksandar Kojic, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 978 days.

(21) Appl. No.: 11/477,404

(22) Filed: Jun. 28, 2006

(65) Prior Publication Data

US 2008/0003490 A1    Jan. 3, 2008

(51) Int. Cl.
*H01M 2/00* (2006.01)
*H01M 10/44* (2006.01)

(52) U.S. Cl. .............................. 439/61; 429/63; 429/64; 429/7; 429/9; 429/50

(58) Field of Classification Search ........................ None
See application file for complete search history.

(56) References Cited

U.S. PATENT DOCUMENTS

| | | | |
|---|---|---|---|
| 6,335,115 B1 * | 1/2002 | Meissner | ..................... 429/117 |
| 6,766,817 B2 | 7/2004 | da Silva | |
| 6,918,404 B2 | 7/2005 | da Silva | |
| 7,066,586 B2 | 6/2006 | da Silva | |
| 2006/0093871 A1 * | 5/2006 | Howard et al. | ................. 429/9 |

FOREIGN PATENT DOCUMENTS

WO    WO 2007/006121    *    1/2007

OTHER PUBLICATIONS

Christensen et al., "Effect of anode film resistance on the charge/discharge capacity of a lithium-ion battery," Journal of the Electrochemical Society, 150 (2003) A1416.
Christensen et al., "Cyclable Lithium and Capacity Loss in Li-ion Cells," Journal of the Electrochemical Society, 152 (2005) A818.
Aora et al., "Mathematical Modeling of the Lithium Deposition Overcharge Reaction in Lithium-ion Batteries Using Carbon-based Negative Electrodes," Journal of the Electrochemical Society, 146 (1999) 3543.

* cited by examiner

*Primary Examiner*—Dah-Wei D Yuan
*Assistant Examiner*—Kwang Han
(74) *Attorney, Agent, or Firm*—Kenyon & Kenyon LLP

(57) ABSTRACT

A lithium-ion battery cell includes at least two working electrodes, each including an active material, an inert material, an electrolyte and a current collector, a first separator region arranged between the at least two working electrodes to separate the at least two working electrodes so that none of the working electrodes are electronically connected within the cell, an auxiliary electrode including a lithium reservoir, and a second separator region arranged between the auxiliary electrode and the at least two working electrodes to separate the auxiliary electrode from the working electrodes so that none of the working electrodes is electronically connected to the auxiliary electrode within the cell.

13 Claims, 6 Drawing Sheets

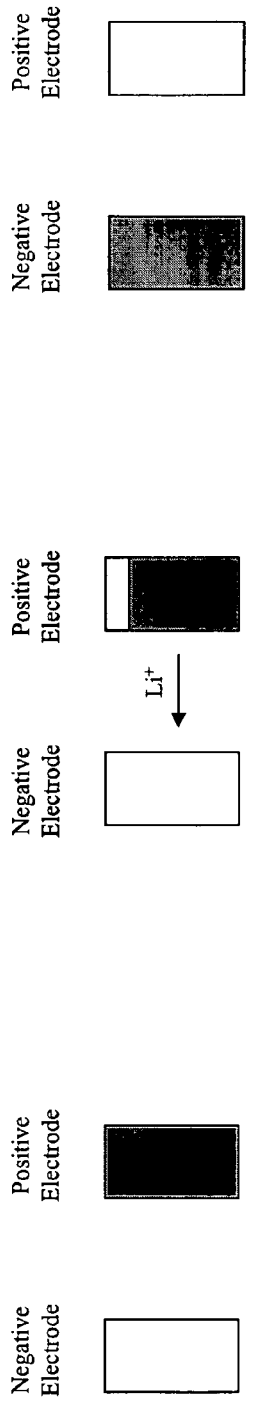
Figure 2A  Initial (discharged) state of cell
Figure 2B  Cell during charge
Main Reactions:
$Li^+ + e^- + N \rightarrow LiN$    $LiP \rightarrow Li^+ + e^- + P$
Figure 2C  Charged state of cell
Figure 2D  Cell during discharge
Main Reactions:
$LiN \rightarrow Li^+ + e^- + N$    $Li^+ + e^- + P \rightarrow LiP$
Figure 2E  Final (discharged) state of cell

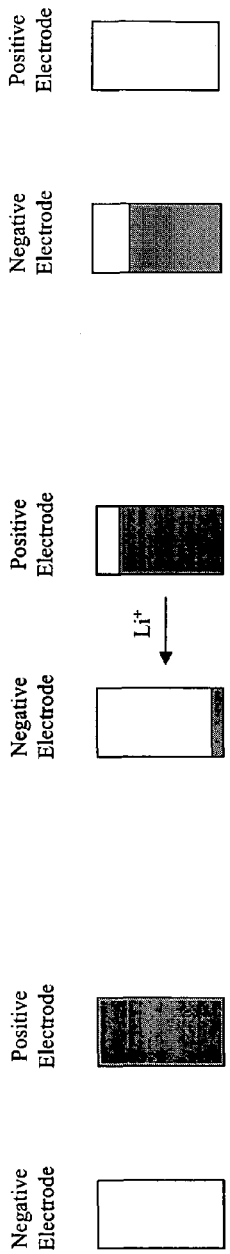
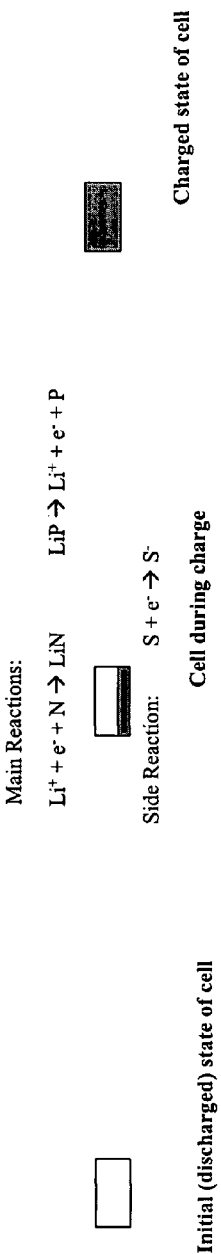
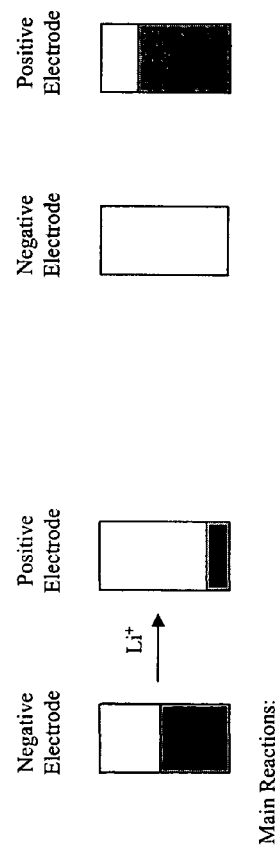
Figure 3A — Initial (discharged) state of cell
Figure 3B — Cell during charge
Main Reactions: $Li^+ + e^- + N \rightarrow LiN$    $LiP \rightarrow Li^+ + e^- + P$
Side Reaction: $S + e^- \rightarrow S^-$
Figure 3C — Charged state of cell
Figure 3D — Cell during discharge
Main Reactions: $LiN \rightarrow Li^+ + e^- + N$    $Li^+ + e^- + P \rightarrow LiP$
Figure 3E — Final (discharged) state of cell

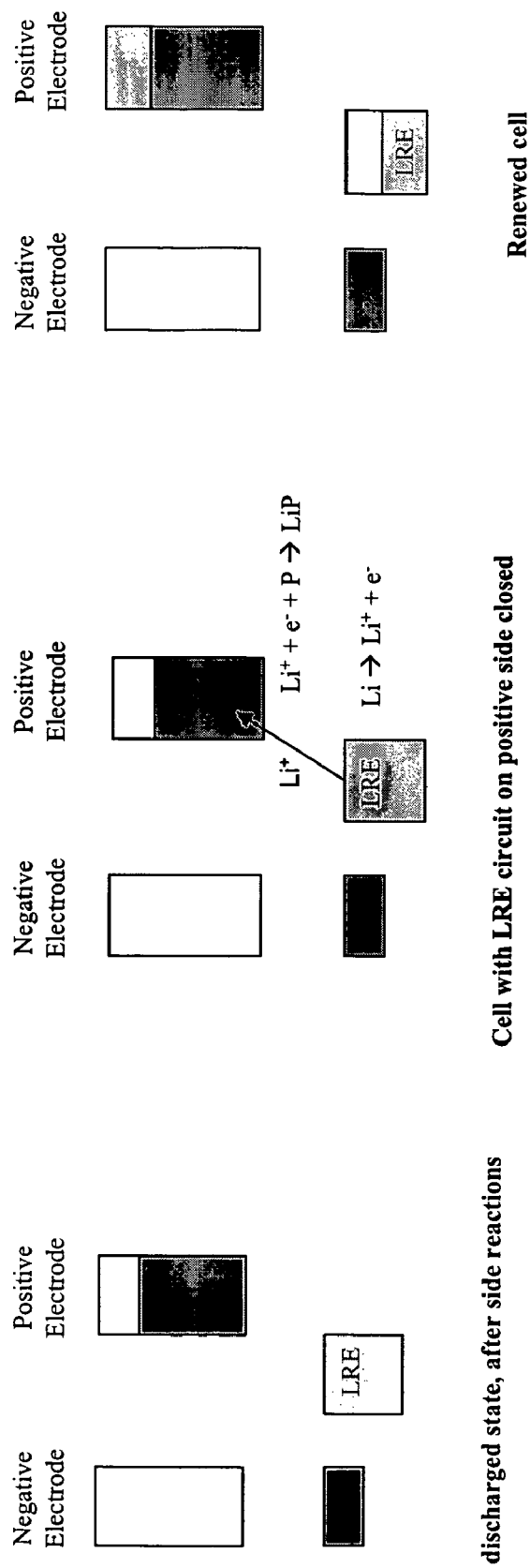

LITHIUM RESERVOIR SYSTEM AND METHOD FOR RECHARGEABLE LITHIUM ION BATTERIES

FIELD OF THE INVENTION

The present invention relates to a method and system to replenish lithium-ion battery capacity that is lost due to side reactions over the battery's lifetime.

BACKGROUND INFORMATION

The capacity of a lithium-ion battery may decrease over its lifetime due to a loss of the active material and/or consumption of charge via side reactions. Efforts have been made to decrease the loss of capacity via the discovery of improved materials.

Rechargeable lithium-ion batteries may be an attractive energy storage system for portable electronics and hybrid-electric vehicles because of their high energy density and rate capability. Such batteries, however, may experience degradation, which may limit their useful life. In particular, rechargeable lithium-ion batteries may experience a decrease in useable capacity (that is, "capacity fade") and/or an increase in the internal resistance of the battery (that is, "power fade"). Here, the capacity fade may result from degradation or loss of the active material that serves as a host to the lithium ions in the working electrodes of the battery, or from loss of capacity due to side reactions at one or both of the working electrodes.

Other prior cells have been designed to compensate for first-cycle lithium loss during solid electrolyte interphase (SEI) formation, which itself may be a side reaction. In addition, U.S. Pat. No. 6,335,115, entitled "Secondary Lithium-ion Cell with an Auxiliary Electrode" (herein referred as "the Meissner reference") discusses the use of an auxiliary lithium electrode that purportedly compensates for lithium loss throughout the life of the cell. In particular, the Meissner reference refers to ionic isolation and electronic isolation to isolate an auxiliary electrode from the working electrodes. According to the Meissner reference, ionic isolation involves an orientation of the battery in which the lithium-ion containing electrolyte contacts the two working electrodes, but not the auxiliary electrode. The auxiliary lithium electrode is presumably always in electronic contact with one of the working electrodes, but replenishment of lithium to the depleted working electrode does not occur until the cell is reoriented such that the electrolyte is in contact with both the working electrode and the auxiliary electrode.

The use of an auxiliary lithium electrode as discussed in the Meissner reference cannot be practically implemented in a lithium-ion battery because the battery design would require that the electrolyte not completely fill the ports of the separator and working electrodes. However, the porous separator could act as a wick to transport the electrolyte to the region of the separator that contacts the auxiliary electrode. Even residual electrolyte on the ports of this region of the separator would allow transport of lithium from the auxiliary electrode to the working electrode. Lithium transfer would continue until the potentials of the working and auxiliary electrodes equilibriated. Excessive lithium transfer beyond the point of capacity balance between the two working electrodes would result in reduction of the cell's capacity. (See Christensen et al., "Effect of anode film resistance on the charge/discharge capacity of a lithium-ion battery," Journal of the Electrochemical Society, 150 (2003) A1416, and Christensen et al., "Cyclable Lithium and Capacity Loss in Li-ion Cells," Journal of the Electrochemical Society, 152 (2005) A818). Moreover, shorting of the auxiliary-electrode-working-electrode circuit via imperfect ionic isolation would lead to rapid transfer of lithium to the working electrode and possible deposition of lithium on the electrode surface. Such lithium deposition may pose a safety risk and/or degrade the cell because the lithium metal reacts rapidly and exothermically with the organic solvent used in the electrolyte. (See Aora et al., "Mathematical Modeling of the Lithium Deposition Overcharge Reaction in Lithium-ion Batteries Using Carbon-based Negative Electrodes," Journal of the Electrochemical Society, 146 (1999) 3543).

Even if it were possible to maintain ionic isolation of the auxiliary electrode until lithium transfer is required, the cell design referred to by the Meissner reference would require additional electrode and separator material that is unutilized. Moreover, lithium transport between the two working electrodes of the cell would not be possible if the orientation of the cell were such that the two working electrodes are not in ionic contact. Indeed, even if the above-discussed concerns were addressed, relying upon reorientation of the battery significantly reduces the number of potential applications. For example, if battery-powered devices such as power tools are used in more than one orientation the auxiliary-electrode-working-electrode circuit could close unintentionally during the operation of the battery.

Accordingly, the approach advocated by the Meissner reference is limited to applications having a fixed orientation.

In regards to electronic isolation, the Meissner reference requires that the lithium auxiliary electrode be placed between the positive and negative electrodes. However, such placement of the lithium auxiliary electrode would reduce the uniformity of the current distribution, and therefore the rate capability of the cell, when transferring lithium from one working electrode to the other. The Meissner reference may also require that the auxiliary electrode be connected to a metallic jacket.

SUMMARY OF THE INVENTION

The present invention relates to a method and system to replenish lithium-ion battery capacity that is lost due to side reactions and/or other capacity that is lost over the battery's lifetime. In this regard, an exemplary embodiment and/or exemplary method of the present invention may address certain defects inherent in other prior methods for lithium compensation, and may provide certain improvements over the other prior methods.

According to an exemplary embodiment and/or exemplary method of the present invention, lithium-ion capacity that is lost due to side reactions over the battery's lifetime is replenished using an additional lithium electrode, which serves as lithium reservoir to replace the lost charge to one or both working electrodes of the battery. In this regard, to overcome the difficulties in determining the precise amount of lithium to be transferred to the working electrodes, and thereby avoid the risk of inserting too much lithium into the working electrodes which can degrade the cell and pose a safety hazard, the exemplary embodiment and/or exemplary method of the present invention uses the additionally provided lithium reservoir electrode (LRE) as a reference electrode to measure the open-circuit potential (OCP) of each working electrode thereby making known the state of charge (SOC) of each electrode. Once the state of charge (SOC) of each electrode is known, the appropriate amount of lithium can be transferred from the lithium reservoir electrode (LRE) and inserted into one or both working electrodes.

According to an exemplary embodiment and/or exemplary method of the present invention, the state of charge (SOC) of each electrode is determined by measuring the full-cell potential and/or current, and applying these measurements to a model of the cell to calculate the state of charge (SOC) of each working electrode.

According to an exemplary embodiment and/or exemplary method of the present invention, an exemplary lithium-ion cell is provided, which includes three terminals—two working terminals and a lithium reservoir electrode (LRE) terminal. The working terminals include a negative electrode terminal and a positive electrode terminal. The exemplary lithium-ion cell may be manufactured in any configuration, including, for example, such configurations as a spirally wound configuration and a prismatically stacked configuration.

According to an exemplary embodiment and/or exemplary method of the present invention, uniformity of the current distribution is maintained when transferring lithium from one working electrode to the other by electronically isolating the lithium reservoir electrode (LRE) from the working electrodes such that the lithium reservoir electrode (LRE) is arranged outside of the current path between the two working electrodes.

According to an exemplary embodiment and/or exemplary method of the present invention, the amount and rate of lithium transfer from the lithium reservoir electrode (LRE) to one of two working electrodes is controlled via a battery monitoring system to prevent, or at least minimize, an excessive transfer of lithium which may pose a safety risk and degrade the cell via lithium deposition. In this regard, when replacing lost capacity of the battery cell, the battery monitoring system may enhance battery life. Hence, the exemplary embodiment and/or exemplary method of the present invention provides a battery that replaces lost capacity using a lithium reservoir and an effective monitoring and control system.

According to an exemplary embodiment and/or exemplary method of the present invention, a metallic jacket is not required for connection to an auxiliary electrode.

BRIEF DESCRIPTION OF THE DRAWINGS

FIG. 2A shows an exemplary discharged state of a lithium-ion battery cell prior to charging.

FIG. 2B shows an exemplary charging state of a lithium-ion battery cell, in which there are no side reactions.

FIG. 2C shows an exemplary charged state of a lithium-ion battery cell, in which there are no side reactions.

FIG. 2D shows an exemplary discharging state of a lithium-ion battery cell, in which there are no side reactions.

FIG. 2E shows an exemplary discharged state of a lithium-ion battery cell, in which there are no side reactions.

FIG. 3A shows an exemplary discharged state of a lithium-ion battery cell, in which no side reactions occurred during a previous charging or discharging of the lithium-ion battery cell.

FIG. 3B shows an exemplary charging state of a lithium-ion battery cell, in which an irreversible side reaction occurs at the negative electrode during the charging of the lithium-ion battery cell.

FIG. 3C shows an exemplary charged state of a lithium-ion battery cell, in which an irreversible side reaction occurred at the negative electrode during the charging of the lithium-ion battery cell.

FIG. 3D shows an exemplary discharging state of a lithium-ion battery cell, in which an irreversible side reaction occurred at the negative electrode during the charging of the lithium-ion battery cell.

FIG. 3E shows an exemplary discharged state of a lithium-ion battery cell, in which an irreversible side reaction occurred at the negative electrode during the charging of the lithium-ion battery cell.

FIG. 6A shows an exemplary lithium-ion cell and corresponding lithium reservoir electrode (LRE) in a discharge state, after side reactions have occurred.

FIG. 6B shows the exemplary lithium-ion cell and corresponding lithium reservoir electrode (LRE), in which an closed electronic circuit has been applied between the lithium reservoir (LRE) and the positive electrode of the exemplary lithium-ion cell.

FIG. 6C shows the exemplary lithium-ion cell in a renewed state after the closed electronic circuit has been applied between the lithium reservoir (LRE) and the positive electrode of the exemplary lithium-ion cell.

DETAILED DESCRIPTION

Figure 1:
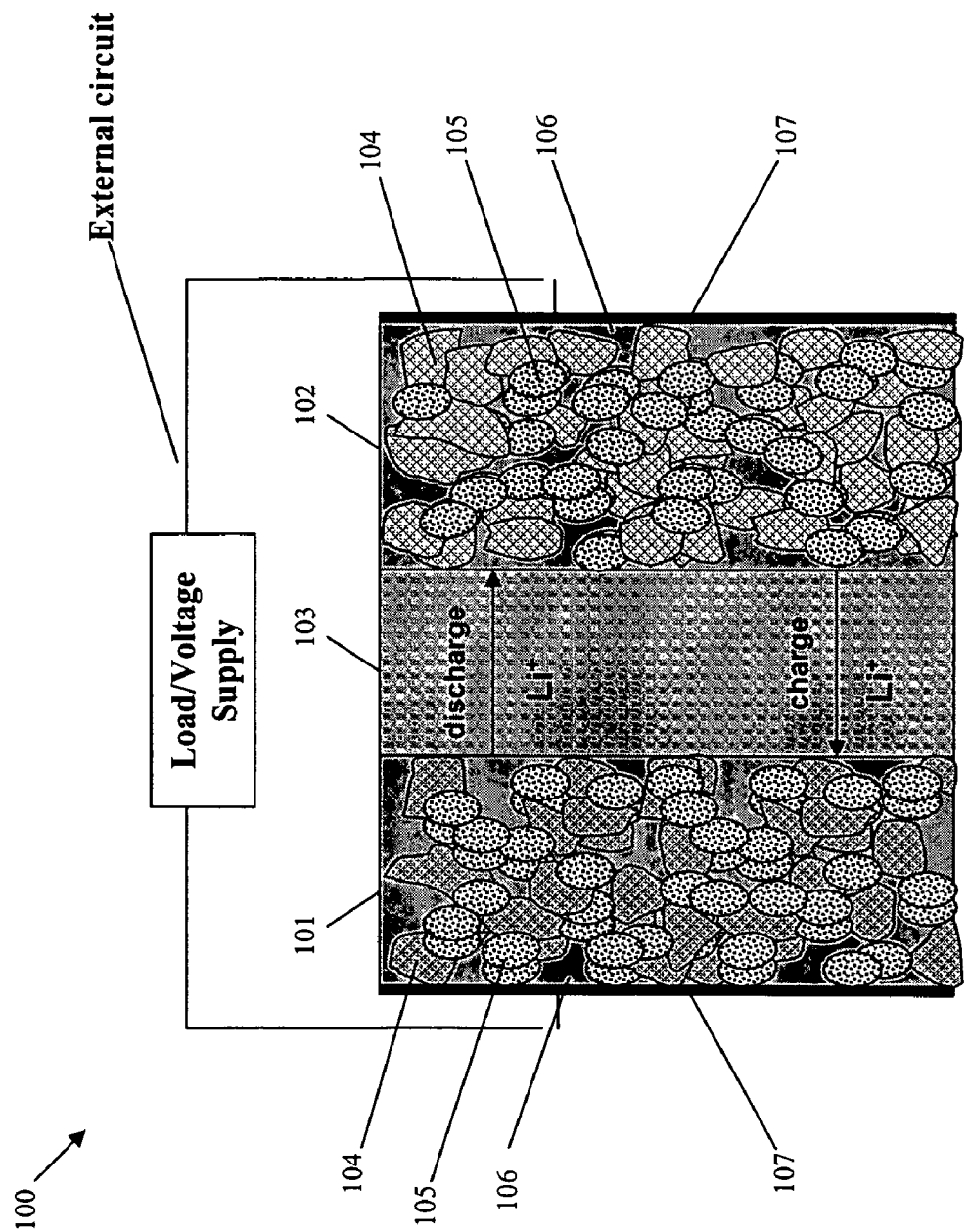
FIG. 1 shows a "conventional" lithium-ion battery cell.

FIG. 1 shows a "conventional" lithium-ion cell 100, which includes a negative electrode 101, a positive electrode 102 and a separator region 103 between the negative electrode 101 and the positive electrode 102. The negative electrode 101 and the positive electrode 102 each include active materials 104, inert materials 105, electrolyte 106 and a current collector 107. The separator region 103 includes an electrolyte with a lithium cation, and serves as a physical barrier between the negative electrode 101 and the positive electrode 102 so that neither electrode is electronically connected within the cell 100.

During charging, there is a generation of electrons at the positive electrode 102 and consumption of an equal amount of electrons at the negative electrode 101. The electrons are transferred via an external circuit. In an ideal operation of the cell 100, the electrons are generated at the positive electrode 102 because there is an extraction of lithium ions from the active material 104 of the positive electrode 102, and the electrons are consumed at the negative electrode 101 because there is an insertion of lithium ions into the active material 104 of the negative electrode 101. During discharge, the opposite reactions occur.

The transfer of lithium can be described by certain main charge-transfer reactions that occur at the positive and negative electrodes 102, 101. For example, if P represents the positive electrode material and N the negative electrode material, the main charge-transfer reactions that occur at the negative electrode 101 and the positive electrode 102 during charge may be represented, respectively, as follows:

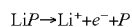

$$LiP \rightarrow Li^+ + e^- + P$$

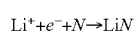

$$Li^+ + e^- + N \rightarrow LiN$$

Here LiP and LiN are the positive and negative electrode materials, respectively, intercalated with lithium. For discharging, these reactions proceed in the opposite direction.

FIGS. 2A to 2E show the charge and discharge of a lithium-ion cell in which there are no side reactions. In particular, in the discharged state of the cell as shown in FIG. 2A, lithium exists in the positive electrode (represented by shading) but not in the negative electrode. During charge as shown in FIG. 2B, lithium is transferred from the positive electrode to the negative electrode. Upon reaching the charged stated as shown in FIG. 2C, all of the lithium has been transferred to the negative electrode. During a subsequent discharge as shown in FIG. 2D, the opposite reactions occur, and the lithium is transferred from the negative electrode to the positive electrode. Upon reaching the discharged state as shown in FIG. 2E, all of the lithium has been transferred to the positive electrode.

In an ideal operation of the cell, the main charge-transfer reactions are the only charge-transfer reactions that occur, and are fully reversible. For non-ideal cells, however, some charge may be consumed via a side reaction, which results in a permanent capacity loss if the side reaction is not fully reversible. In this instance, a side reaction is defined as a charge-transfer reaction that does not involve an insertion or extraction of lithium ions into or out of the active material. For example, a side reaction may involve the decomposition of the solvent or the formation of the solid electrolyte interphase (SEI) at the negative electrode.

FIGS. 3A to 3E show the charge and discharge of a lithium-ion cell, in which an irreversible side reaction occurs at the negative electrode during charge, which consumes electrons that ideally should be consumed by the main reaction. In FIG. 3B, S is a generic reactant that may represent, for example, a solvent such as anion, or a contaminant. The product $S^-$ may be soluble in the electrolyte, or can form a solid precipitate with the lithium cation. Because the side reaction is irreversible, the reverse reaction does not occur during discharge, and hence the charge is only partially transferred back to the positive electrode. The small box below the negative electrode box represents the charge that is consumed via the side reaction. Here, the small box is shaded to indicate that some of the charge has been consumed irreversibly. Since the charge is conserved the total area of the shaded regions remains constant.

The charge and discharge shown in FIGS. 3A to 3E illustrate the effect of an irreversible side reaction. However, a side reaction may be partially reversible, in which case a portion of the charge consumed by the side reaction is returned to the positive electrode.

The capacity of the cell is proportional to the number of electrons that are reversibly transferred from one electrode to the other electrode via the external circuit. Accordingly, as seen from FIGS. 3A to 3E, side reactions can reduce a cell's capacity.

Figure 4:
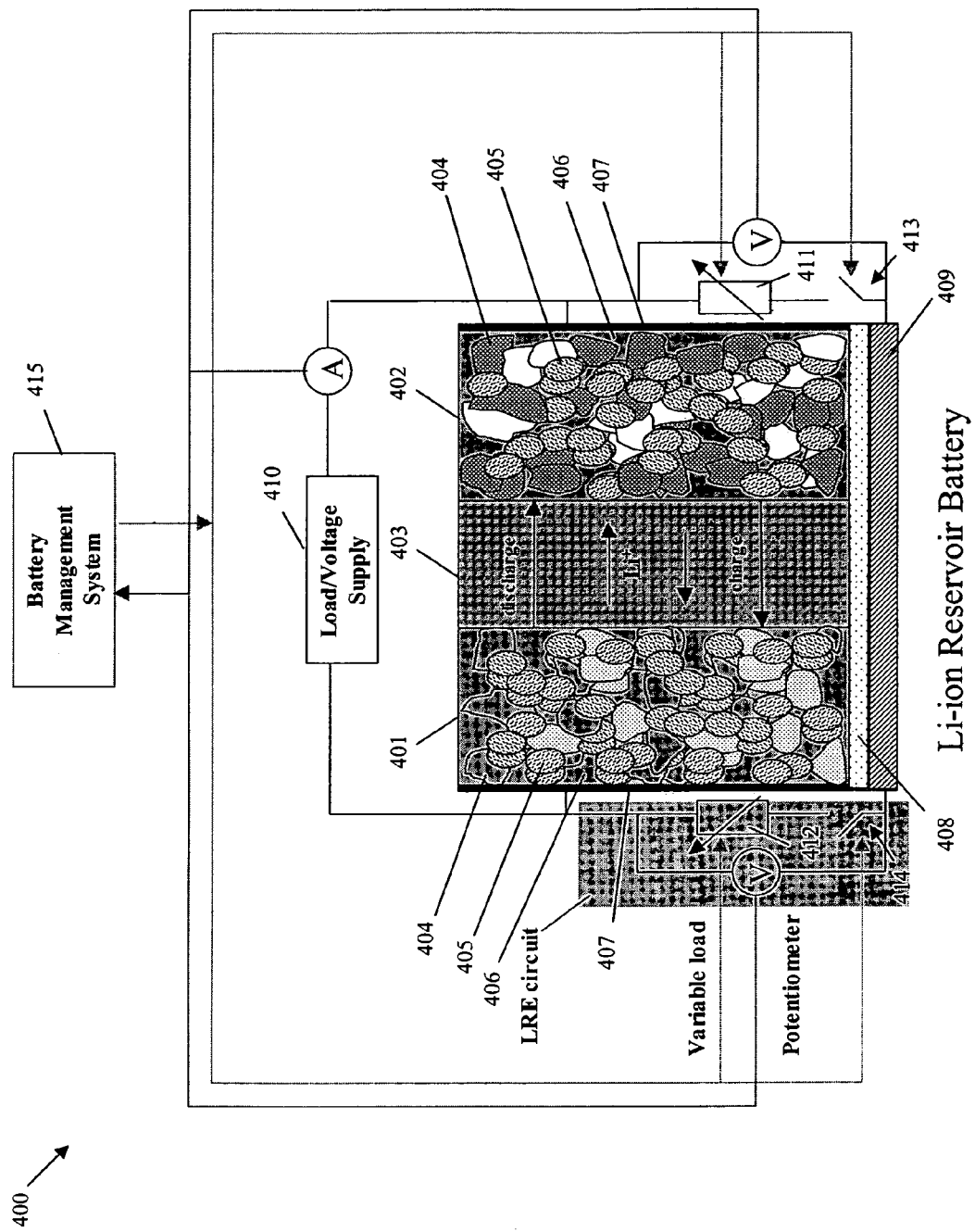
FIG. 4 shows an exemplary rechargeable lithium-ion cell, which includes a lithium reservoir electrode (LRE) configured as a reference electrode.

FIG. 4 shows an exemplary rechargeable lithium-ion cell 400, which includes a lithium reservoir electrode (LRE) 409 configured as a reference electrode. In addition to the lithium reservoir electrode (LRE) 409, the exemplary rechargeable lithium-ion cell 400 includes a negative electrode 401, a positive electrode 402, a separator region 403 between the negative electrode 401 and the positive electrode 402, and a separator region 408 between the working electrodes 401, 402 and the lithium reservoir electrode (LRE) 409.

The negative electrode 401 and the positive electrode 402 each contain active materials 404 into which lithium may be inserted. Hence, the active materials 404 are also referred to as lithium-insertion materials 404. With respect to the negative electrode 401, the active materials 404 may include, for example, graphite, disordered carbon, and/or lithium titanate. With respect to the positive electrode 402, the active materials 404 may include, for example, a transition metal oxide (e.g., lithium manganese oxide), and/or a lithium metal phosphate (e.g., lithium iron phosphate).

The negative electrode 401 and the positive electrode 402 each also include inert materials 405, electrolyte 406 and a current collector 407. The inert materials 405 may include, for example, a polymeric binder (e.g., polyvinyldifluoride (PVDF)) and/or a carbon additive for conduction (e.g., acetylene black, graphite and/or carbon fiber). The electrolyte 406 may include, for example, Lithium Hexafluorophosphate (LiPF6) in a nonaqueous electrolyte, a cyclic carbonate (e.g., ethylene carbonate, propylene carbonate), a linear carbonate (e.g., dimethyl carbonate, ethyl methyl carbonate, diethyl carbonate), an organic solvent (e.g., acetonitrile), and/or a polymer electrolyte (e.g., polyethylene oxide). The current collector 407 may include, for example, copper for the negative electrode 401, and aluminum for the positive electrode 402. Additionally, the lithium reservoir electrode (LRE) 409 may be attached to a platinum wire current collector.

The separator region 403 between the negative electrode 401 and the positive electrode 402 serves as a physical barrier between the negative electrode 401 and the positive electrode 402 so that neither electrode is electronically connected within the cell 400. The separator region 403 includes, for example, an electrolyte with a lithium cation. If a liquid electrolyte is used, the separator region 403 may include, for example, polyethylene and/or polypropylene. If a solid electrolyte is used, the separator region 403 may include, for example, a polymer electrolyte. A gelled electrolyte (mixture of liquid and solid) may also be provided.

The separator region 408 between the working electrodes 401, 402 and the lithium reservoir electrode (LRE) 409 serves as a physical barrier between the negative electrode 401 and the lithium reservoir electrode (LRE) 409, and between the positive electrode 402 and the lithium reservoir electrode (LRE) 409, such that none of the electrodes are electronically connected within the cell 400. The separator region 408 may include, for example, an electrolyte with a lithium cation, or another type of electrolyte, including any of the exemplary electrolytes described above with respect to the separator region 403. In this regard, the electrolyte with a lithium cation, or other type of electrolyte, included in the separator region 408 enables lithium-ion transfer between the lithium reservoir electrode (LRE) 409 and the working electrodes 401/402.

During normal operation, the negative electrode terminal 401 and the positive electrode terminal 402 are connected to either end of a load during discharge, and to a power supply 410 during charge. To replenish the capacity of the cell 400 lost due to side reactions, the circuit between the lithium reservoir electrode (LRE) 409 and one of the two working electrodes 401/402 is closed so that electrons can flow through the circuit from the lithium reservoir electrode (LRE) 409 to the working electrode 401 or 402. Lithium ions are concurrently transferred ionically through the separator 408 from the lithium reservoir electrode (LRE) 409 to the working electrode 401 or 402, thus restoring the cell capacity to its original value. In this regard, the extent to which the working electrode 401 or 402 should be charged is determined so as to prevent overcharging of the working electrode. To determine this, the state of charge (SOC) of each working electrode 401, 402 is determined. The state of charge (SOC) of each working electrode 401, 402 corresponds to the amount of lithium contained in it. When the lithium concentration is at its maximum value, the state of charge (SOC) of the electrode is "1", and when the lithium concentration is at its minimum, the state of charge (SOC) of the electrode is a "0". The lithium reservoir electrode (LRE) 409 is used to increase the state of charge (SOC) of one or both of the working electrodes 401, 402 via the transfer of lithium ions and electrons. In one instance, the lithium reservoir electrode (LRE) 409 may be used as a reference electrode, as shown in FIG. 4, to estimate the open circuit potential (OCP) from which the state of charge (SOC) is determined. Alternatively, the state of charge (SOC) may be determined, as shown in FIG. 5 and described below, using a battery model and measurements of the full-cell potential and current.

In FIG. 4, the lithium reservoir electrode (LRE) 409 is used as a reference electrode, and the potential between the positive electrode terminal 402 and the lithium reservoir electrode (LRE) 409, and/or between the negative electrode terminal 401 and the lithium reservoir electrode (LRE) 409, is measured using a potentiometer. The open circuit potential (OCP) of each working electrode 401, 402 can be measured directly if the cell 400 is at open circuit and has achieved equilibrium. Alternatively, the open circuit potential (OCP) can be estimated based on the reference-electrode potential measurement and the history of the current passing through the cell 400. The state of charge (SOC) is then determined from the measured or estimated open circuit potential (OCP). A battery management system 415 controls the switches 413, 414 and the variable load resistors 411, 412 based on the determined state of charge (SOC). In particular, the battery management system 415 determines at what point to reopen the lithium reservoir circuit, and at what rate the transfer of lithium should proceed at so as to prevent deposition of lithium at the negative electrode 401 or the positive electrode 402.

Figure 5:
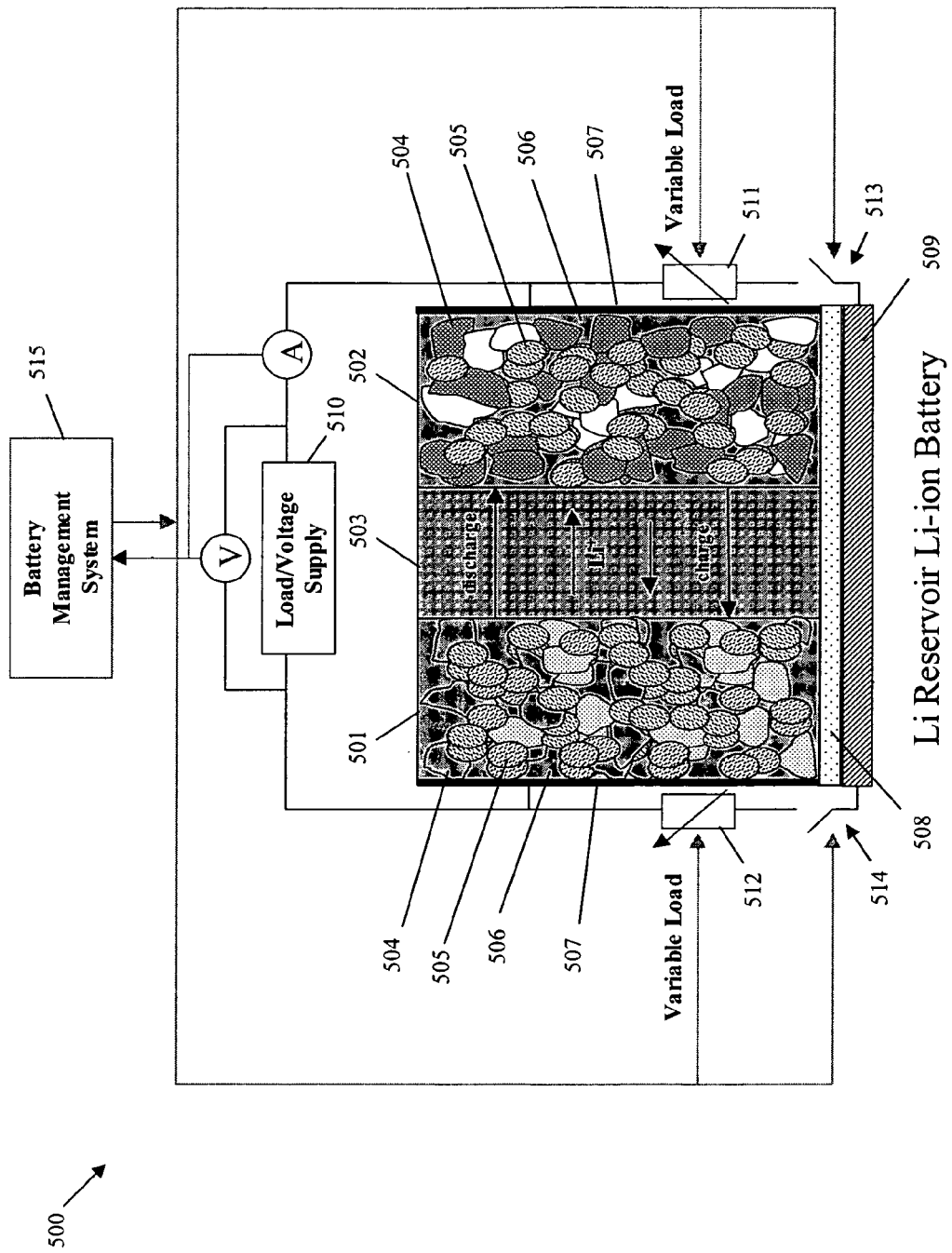
FIG. 5 shows an exemplary rechargeable lithium-ion cell, which includes a lithium reservoir electrode (LRE) not configured as a reference electrode.

FIG. 5 shows an exemplary rechargeable lithium-ion cell 500, which includes a lithium reservoir electrode (LRE) 509 not configured as a reference electrode. In addition to the lithium reservoir electrode (LRE) 509, the exemplary rechargeable lithium-ion cell 500 includes a negative electrode 501, a positive electrode 502, a separator region 503 between the negative electrode 501 and the positive electrode 502, and a separator region 508 between the working electrodes 501, 502 and the lithium reservoir electrode (LRE) 509.

The negative electrode 501 and the positive electrode 502 each contain active materials 504 into which lithium may be inserted. Hence, the active materials 504 are also referred to as lithium-insertion materials 504. With respect to the negative electrode 501, the active materials 504 may include, for example, graphite, disordered carbon, and/or lithium titanate. With respect to the positive electrode 502, the active materials 504 may include, for example, a transition metal oxide (e.g., lithium manganese oxide), and/or a lithium metal phosphate (e.g., lithium iron phosphate).

The negative electrode 501 and the positive electrode 502 each also include inert materials 505, electrolyte 506 and a current collector 507. The inert materials 505 may include, for example, a polymeric binder (e.g., polyvinyldifluoride (PVDF)) and/or a carbon additive for conduction (e.g., acetylene black, graphite and/or carbon fiber). The electrolyte 506 may include, for example, Lithium Hexafluorophosphate (LiPF6) in a nonaqueous electrolyte, a cyclic carbonate (e.g., ethylene carbonate, propylene carbonate), a linear carbonate (e.g., dimethyl carbonate, ethyl methyl carbonate, diethyl carbonate), an organic solvent (e.g., acetonitrile), and/or a polymer electrolyte (e.g., polyethylene oxide). The current collector 507 may include, for example, copper for the negative electrode 501, and aluminum for the positive electrode 502. Additionally, the lithium reservoir electrode (LRE) 509 may be attached to a platinum wire current collector.

The separator region 503 between the negative electrode 501 and the positive electrode 502 serves as a physical barrier between the negative electrode 501 and the positive electrode 502 so that neither electrode is electronically connected within the cell 500. The separator region 503 includes, for example, an electrolyte with a lithium cation. If a liquid electrolyte is used, the separator region 503 may include, for example, polyethylene and/or polypropylene. If a solid electrolyte is used, the separator region 503 may include, for example, a polymer electrolyte. A gelled electrolyte (mixture of liquid and solid) may also be provided.

The separator region 508 between the working electrodes 501, 502 and the lithium reservoir electrode (LRE) 509 serves as a physical barrier between the negative electrode 501 and the lithium reservoir electrode (LRE) 509, and between the positive electrode 502 and the lithium reservoir electrode (LRE) 509, such that none of the electrodes are electronically connected with the cell 500. The separator region 408 may include, for example, an electrolyte with a lithium cation, or another type of electrolyte, including any of the exemplary electrolytes described above with respect to the separator region 403. In this regard, the electrolyte with a lithium cation, or other type of electrolyte, included in the separator region 508 enables lithium-ion transfer between the lithium reservoir electrode (LRE) 509 and the working electrodes 501/502.

In FIG. 5, a model of the cell is used to deconvolute the state of charge (SOC) of one or both of the working electrodes 501, 502 using measurements of the full-cell potential and the current. The battery management system 515 includes the model and controls the switches 513, 514 and variable load resistors 511, 512 based on the determined state of charge (SOC). In particular, the battery management system 515 determines at what point to reopen the lithium reservoir circuit, and at what rate the transfer of lithium should proceed at so as to prevent deposition of lithium at the negative electrode 501 or the positive electrode 502.

FIGS. 6A to 6C show how a replenishment of charge occurs from the lithium reservoir electrode 409/509 to the positive electrode 402/502. In particular, FIG. 6A shows the lithium-ion cell 400/500 in a discharged state, after side reactions, FIG. 6B shows the lithium-ion cell 400/500 with a closed electronic circuit applied between the lithium reservoir electrode (LRE) 409/509 and the positive electrode 402/502 of the lithium-ion cell 400/500, and FIG. 6C shows the renewed cell 400/500.

As shown in FIGS. 6A to 6C, the lithium reservoir electrode (LRE) 409/509 replaces the charge that was lost due to the side reactions, which were described, for example, in connection with FIG. 3. In this instance, the lithium reservoir electrode circuit corresponding to the positive electrode 402/502 is closed to allow electrons to flow from the lithium reservoir electrode (LRE) 409/509 to the positive electrode 402/502. Lithium dissolves from the lithium reservoir electrode (LRE) 409/509, and is transferred through the electrolyte in the separator region 408/508 to the positive electrode 402/502, where it is inserted via the main insertion reaction. The appropriate amount of charge to be transferred is determined by the battery management system so that the cell 400/500 returns to its original capacity.

What is claimed is:

1. A method to replenish lithium-ion capacity of a battery cell including two working electrodes and an auxiliary electrode, the method comprising:
measuring an open circuit potential of each of the two working electrodes using the auxiliary electrode as a reference electrode during an equilibrium state of the working electrodes at open circuit;
determining a state of charge of each of the two working electrodes based on the measured open circuit potential of each of the two working electrodes; and
transferring lithium from the auxiliary electrode to at least one of the two working electrodes based on the determined state of charge,
wherein:
the battery cell includes:
a first separator region arranged between the two working electrodes to separate the two working electrodes so that none of the two working electrodes are electronically connected within the cell; and
a second separator region arranged between the auxiliary electrode and the two working electrodes to separate the auxiliary electrode from the two working electrodes so that none of the two working electrodes is electronically connected to the auxiliary electrode within the cell;
the two working electrodes include a negative electrode and a positive electrode;
each of the two working electrodes includes an active material, an inert material, an electrolyte, and a current collector; and
the auxiliary electrode includes a lithium reservoir.

2. The method of claim 1, wherein the transfer of lithium accommodates loss of capacity due to a side reaction.

3. The method of claim 1, wherein lithium is transferred between the two working electrodes through the first separator region.

4. The method of claim 1, wherein the first separator region includes an electrolyte with a lithium cation.

5. The method of claim 1, wherein the second separator region includes an electrolyte with a lithium cation.

6. The method of claim 1, wherein:
a power supply is connected to the current collector of each of the two working electrodes to charge the two working electrodes;
a first electronic circuit connects the power supply to the current collector of each of the two working electrodes; and
a second electronic circuit connects the current collector of at least one of the two working electrodes to the auxiliary electrode.

7. The method of claim 6, wherein the second electronic circuit includes:
a variable load resistor and a switch connected in series between the current collector and the auxiliary electrode.

8. The method of claim 7, wherein:
a battery management system controls the variable load resistor and the switch.

9. The method of claim 8, wherein the battery management system determines the state of charge.

10. The method of claim 8, wherein the battery management system determines at what point to open the second electronic circuit, and a rate of transfer of lithium from the lithium reservoir.

11. The method of claim 1, wherein an electronic circuit connects at least one of the two working electrodes to the auxiliary electrode so that when the circuit is closed electrons flow from the auxiliary electrode to the at least one working electrode, and lithium ions flow concurrently through the second separator from the auxiliary electrode to the at least one working electrode.

12. The method of claim 11, further comprising:
monitoring and controlling the transfer of lithium via a battery monitoring system.

13. The method of claim 12, wherein the battery management system determines at what point to open the electronic circuit, and a rate of transfer of lithium from the lithium reservoir.

* * * * *